W. JACOBUS.
PIPE-FASTENER.

No. 184,287.  Patented Nov. 14, 1876.

Witness
Horace Harris
Saml. T. Smith

Inventor
William Jacobus

UNITED STATES PATENT OFFICE.

WILLIAM JACOBUS, OF NEWARK, NEW JERSEY.

IMPROVEMENT IN PIPE-FASTENERS.

Specification forming part of Letters Patent No. 184,287, dated November 14, 1876; application filed May 10, 1876.

*To all whom it may concern:*

Be it known that I, WILLIAM JACOBUS, of Newark, in the county of Essex and State of New Jersey, have invented a certain Improvement in Pipe-Fasteners, of which the following is a specification:

My invention consists in making a joint pipe-fastener to hold the pipe more secure, and keep it from turning or sliding.

Figure 1:
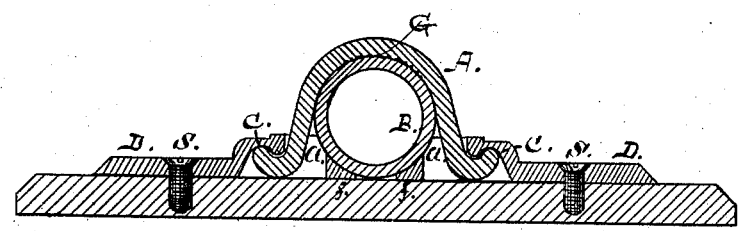
Figure 2:
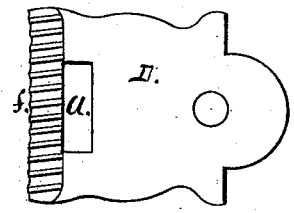

Figure 1 is a longitudinal section. Fig. 2 is a plan of one end piece, showing the serrated end.

In my drawings it will be seen that A is a strap, usually cast in this U shape to be put over the pipe B. The strap is made with the ends C turned over to engage the end plates D as a fulcrum and joint. The ends C are passed through the holes $a$ in the plates, and then the fastener is placed over the pipe, and the plates, pressed down, inclose the pipe firmly, held by the screws S, the serrated ends $f$ biting into the under side of the pipe. These teeth are usually cut at an oblique angle from the sharp edge of the plate. The strap has also in the inside of the top part ridges running obliquely across, which also are designed, in the pressure, to bite into the pipe, and help to keep it in position. The object of having these ridges run at an oblique angle is, that they shall, at the same time, both assist to keep the pipe from turning over and from moving endwise.

Instead of the joints being made at the junction of the strap and plates, the strap may be jointed on the top, and the sections be cast with the plate ends attached; or the fixed joint, like that last named, may be made at the junction of the strap and plates, in place of the separable joint above described, and in either case the mode of use and effect would be substantially the same.

I claim—

1. In a pipe-fastener, the U-shaped strap A, with the fulcrum ends C, to close over the pipe B, in combination with the end plates D, substantially as specified.

2. The strap A, in combination with the plates D, having the ends $f$ made to close against the under side of the pipe B, and held by the screws S, substantially as set forth.

3. In a pipe-fastener, the strap A and plates D, forming a joint-connection by means of the holes $a$ in the plates, and the ends C of the strap, substantially as and for the purposes specified.

4. The jointed pipe-fastener, having the serrated ends $f$ of the plates, and the ridged inside G of the strap, substantially as and for the purpose set forth.

WILLIAM JACOBUS.

Witnesses:
HORACE HARRIS,
SAML. V. SMITH.